May 4, 1954   E. J. HUTCHISON, SR   2,677,209
RAT AND MOUSE TRAP

Filed Sept. 9, 1952   3 Sheets-Sheet 1

INVENTOR.
Edward J. Hutchison Sr.

BY *Victor J. Evans & Co.*

ATTORNEYS

May 4, 1954   E. J. HUTCHISON, SR   2,677,209
RAT AND MOUSE TRAP
Filed Sept. 9, 1952   3 Sheets-Sheet 2
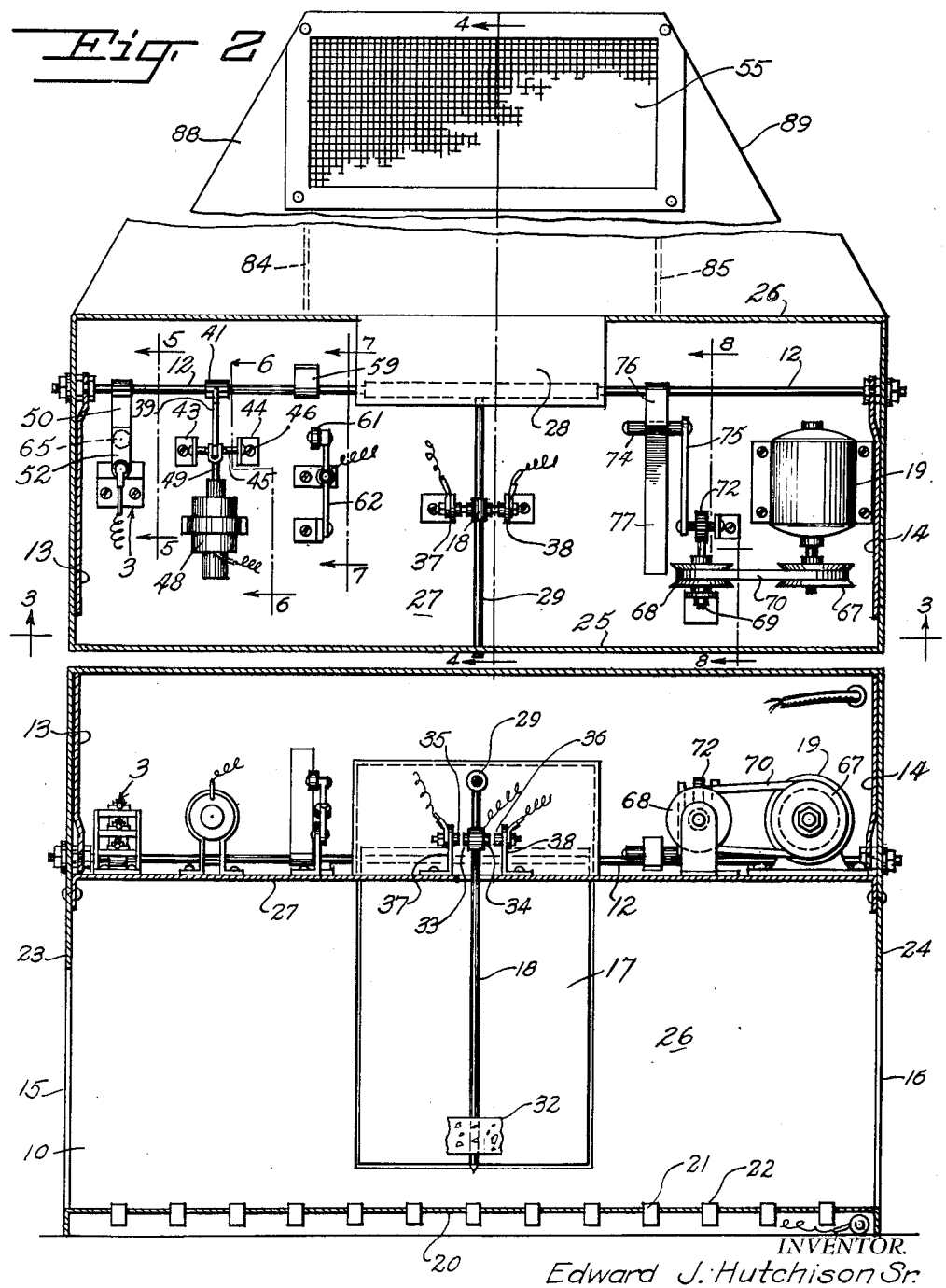
INVENTOR.
Edward J. Hutchison Sr.
BY Victor J. Evans & Co.
ATTORNEYS

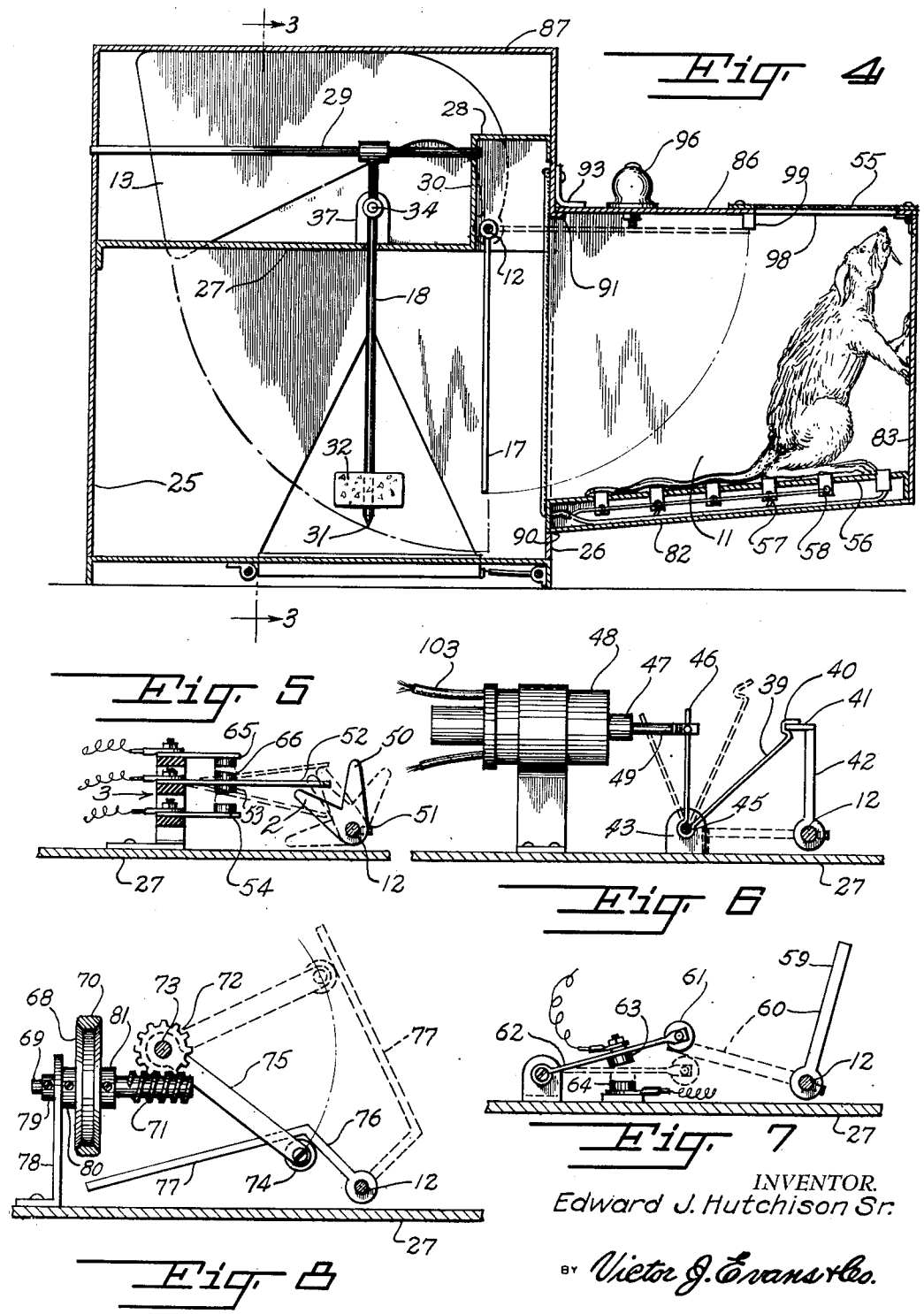

Patented May 4, 1954

2,677,209

UNITED STATES PATENT OFFICE 2,677,209

RAT AND MOUSE TRAP

Edward J. Hutchison, Sr., Hadensville, Va., assignor of one-half to Grady Lester Hutchinson, Arlington, Va.

Application September 9, 1952, Serial No. 308,647

1 Claim. (Cl. 43—99)

This invention relates to animal traps of the type using electrodes for electrocuting animals, and in particular a trap having a chamber open at the ends with bait suspended midway between the ends and adapted to close a circuit which closes doors at the ends of the trap and opens a door in the intermediate part of the trap and which provides communicating means with an electrocution chamber whereby with a grid having a comparatively small electrical charge in the main portion of the trap an animal therein endeavors to escape through the electrocution chamber which has a screened opening in the upper side whereby the animal may be electrocuted and the trap reset.

The purpose of this invention is to provide a mouse and rat trap in which the rodents are electrocuted.

Various types of animal traps have been provided and in some of these the animals are killed however in the most common type of trap the dead animal blocks the passage preventing additional animals from entering the trap. With this thought in mind this invention contemplates an animal trap having an electrocution chamber at one side of a main passage with the door to the electrocution chamber closed as doors to the main passage are opened and wherein the door to the electrocution chamber is opened as the doors to the main chamber or passage are closed.

The object of this invention is, therefore, to provide an electrically actuated mouse or rat trap wherein the rodent is first annoyed with a comparatively low voltage circuit which causes the rodent to pass into a side chamber and in which the rodent is electrocuted with a high voltage circuit in the said side chamber.

Another object of the invention is to provide an animal trap having an electrocution chamber therein wherein the parts of the trap are consecutively actuated after the operation thereof is started by an animal moving bait in the device.

A further object of the invention is to provide an animal trap having an electrocution chamber at one side in which the trap is of a simple and economical construction.

With these and other objects and advantages in view the invention embodies an elongated chamber having openings in the ends with doors for the openings pivotally mounted on a shaft extended through the casing, with an electrocution chamber extended from one side of the casing, with a centrally disposed door also actuated by the shaft positioned to close the electrocution chamber as the doors at the ends of the casing are opened and positioned to open the electrocution chamber as the doors at the ends of the casing are closed, and means providing a low voltage current to electrodes in the floor of the casing and a high voltage current to electrodes in the floor of the electrocution chamber.

Other features and advantages of the invention will appear from the following description taken in connection with the drawings, wherein:

Figure 2 is a sectional plan taken through the upper part of the trap, with parts broken away.

Figure 3 is a longitudinal section through the trap taken on line 3—3 of Figure 2.

Figure 4 is a cross section through the trap taken on line 4—4 of Figure 2 and showing a rat in the electrocution chamber.

Figure 5 is a detail showing a section taken on line 5—5 of Fig. 2 illustrating the double throw switch for applying low voltage current to the grid in the casing and also for applying high voltage current to the grid in the electrocution chamber.

Figure 6 is a detail showing a section taken on line 6—6 of Fig. 2 showing a solenoid for releasing the shaft on which the doors are carried.

Figure 7 is a detail showing a section taken on line 7—7 of Fig. 2 showing a switch for starting the reset motor whereby the doors are returned to the positions shown in Figs. 1 and 4.

Figure 8 is a detail showing a section taken on line 8—8 of Fig. 2 illustrating the operation of the shaft and door resetting means.

Figure 1:
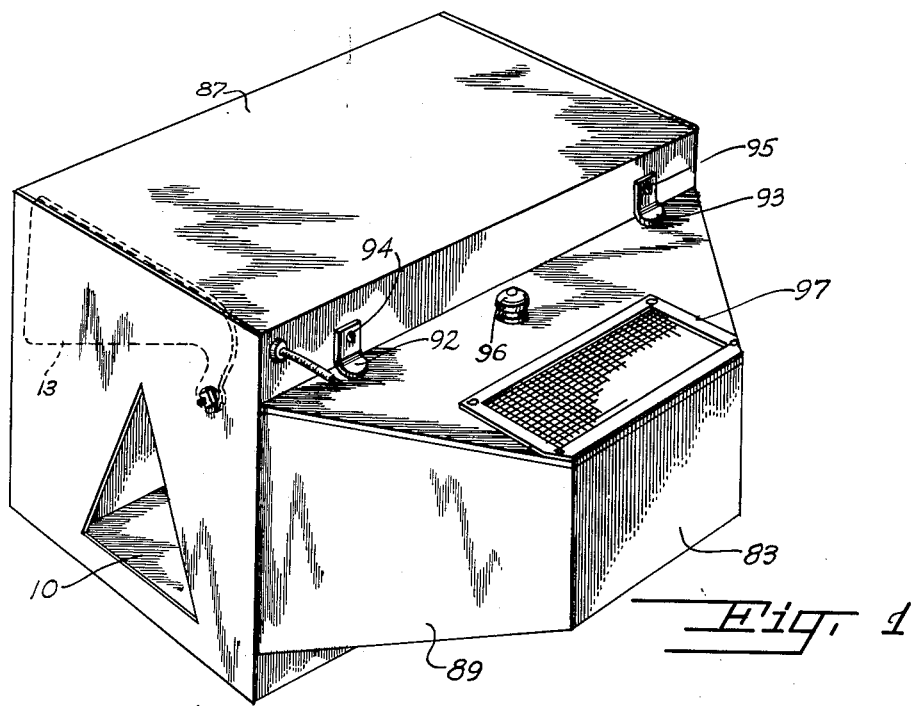
Figure 1 is a perspective view illustrating the general design and arrangement of the trap.

Referring now to the drawings wherein like reference characters denote corresponding parts the improved electric trap of this invention includes an entrance chamber 10, an electrocution chamber 11, an operating shaft 12, doors 13 and 14 carried by the shaft 12 and positioned to close openings 15 and 16, respectively at the ends of the entrance chamber 10, a door or gate 17 also carried by the shaft 12 and positioned to close the electrocution chamber 11, a trigger 18, and a motor 19.

The entrance chamber 10 is provided with a floor 20 having electrodes 21 and 22 therein, end walls 23 and 24 in which the openings 15 and 16 are positioned, respectively and side walls 25 and 26. The upper part of the entrance chamber 10 is provided with a horizontally disposed partition 27 having a box-like section or casing 28 formed integral therewith and, as illustrated in Figs. 3 and 4 the trigger 18 is pivotally mounted on a shaft 29 that is journaled in the side wall 25 and vertically disposed section 30 of the casing 28. The trigger 18 is provided with a point or holder 31 at the lower end of which a piece of cheese, or other bait, as indicated by the numeral 32 is positioned, and contacts 33 and 34 mounted on the upper part of the trigger 18 are positioned to engage contacts 35 and 36, respectively on supports 37 and 38 secured to the partition 27.

The shaft 12 is retained in position with the doors 13, 14, and 17, as shown in Figs. 1 and 4 by a latch 39 having a socket 40 in the upper end, the latch being positioned to engage a finger 41 of an arm 42 which is mounted on the shaft 12. The latch 39 is pivotally mounted in bearings 43 and 44 with a pin 45 and an arm 46 extended from the latch is secured to a core 47 of a solenoid 48 with a rod 49.

As an animal engages the cheese 32 at the lower end of the trigger 18 the trigger is moved to one side whereby the contacts 33 and 35 at one side or 34 and 36 at the other complete a circuit to the solenoid 48 energizing the same whereby the solenoid actuates the latch 39, releasing the finger 41 and arm 42 thereby permitting the doors 13 and 14 to swing downwardly by gravity, moving the door or gate 17 upwardly to the position indicated by the dotted lines in Fig. 4.

In this initial movement the shaft 12 rotates in a counterclockwise direction whereby an arm 50, secured on the shaft 12 with a set screw 51 moves a spring finger or contact arm 52 downwardly whereby a contact 53 engages a stationary contact 54 mounted on plate 27, completing a low voltage circuit to the electrodes 21 and 22 in the floor 20 of the entrance chamber 10. A second arm 2 is arranged in divergent relation with respect to the arm 50 and is secured thereto or formed integral therewith, and the switch assembly of Figure 5 is indicated generally by the numeral 3.

An animal trapped in the entrance chamber feels a tickling sensation and seeks an outlet and seeing a light in the chamber 11, passes into the chamber 11, the upper surface of which is provided with a screen 55 through which the light passes into the chamber. The animal following the light passes to the floor 56 in which electrodes 57 and 58 are positioned.

At this time an arm 59 on the shaft 12 arrives at the position indicated by the dotted lines 60 wherein a roller 61 on a lever 62 is moved downwardly and a contact 63 carried by the lever 62 engages a contact 64 thereby completing a circuit to the motor 19, and the motor starts the shaft 12 rotating in a clockwise direction whereby the arm 50 moves the spring bar 52 upwardly with the contact 66 engaging the contact 65 thereby completing a circuit to the high voltage current which is connected to the electrodes 57 and 58.

By this means the animal is electrocuted and at the same time the shaft is actuated by the motor to return the doors 13 and 14 and also the door 17 to the positions shown in Figs. 1 and 4.

The motor shaft is provided with a pulley 67 which drives a pulley 68 secured to a countershaft 69 through a belt 70 and a delayed action worm 71 on the shaft 69 rotates a worm gear 72 on a shaft 73 whereby a roller 74 on an arm 75 affixed to said worm gear moves an offset lever 76 from the position shown in full lines in Fig. 8 to the position shown in dotted lines as indicated by the numeral 77 whereby with the lever 76 secured to the shaft 12, the shaft 12 is rotated in a clockwise direction, elevating the doors 13 and 14 and returning the door 17 to the positions shown in Figs. 1 and 4. The shaft 69 is journaled in a bracket 78, the shaft being secured in position with a set collar 79 and the pulley and shaft being located with a set collar 80 between the pulley and bracket and a set collar 81 on the opposite side of the pulley.

The electrocution chamber 11 is provided with a base 82, an end wall 83, side walls 84 and 85, and an upper wall 86 and the upper part of the entrance chamber 10 is provided with a top 87.

The electrocution chamber 11 is also provided with outwardly extended side walls 88 and 89, and as illustrated in Figs. 1 and 4 the chamber slides like a drawer being positioned in an opening 90 in the side wall 26 with the upper wall or panel 86 extended over a flange 91 at the upper side of the opening and with the housing of the chamber held by clips 92 and 93 that are pivotally mounted by pins 94 and 95, respectively on the upper part of the side wall 26. A knob 96 is provided, and the electrocution chamber may readily be removed for removing electrocuted animals therefrom.

The screen 55 is mounted in a frame 97 and the frame is positioned over an opening 98 in the upper wall or panel 86 of the electrocution chamber.

A stop 99 is mounted on the under surface of the panel 86 and this stop is positioned to be engaged by the door 17 as the door reaches the open position.

Figure 9:
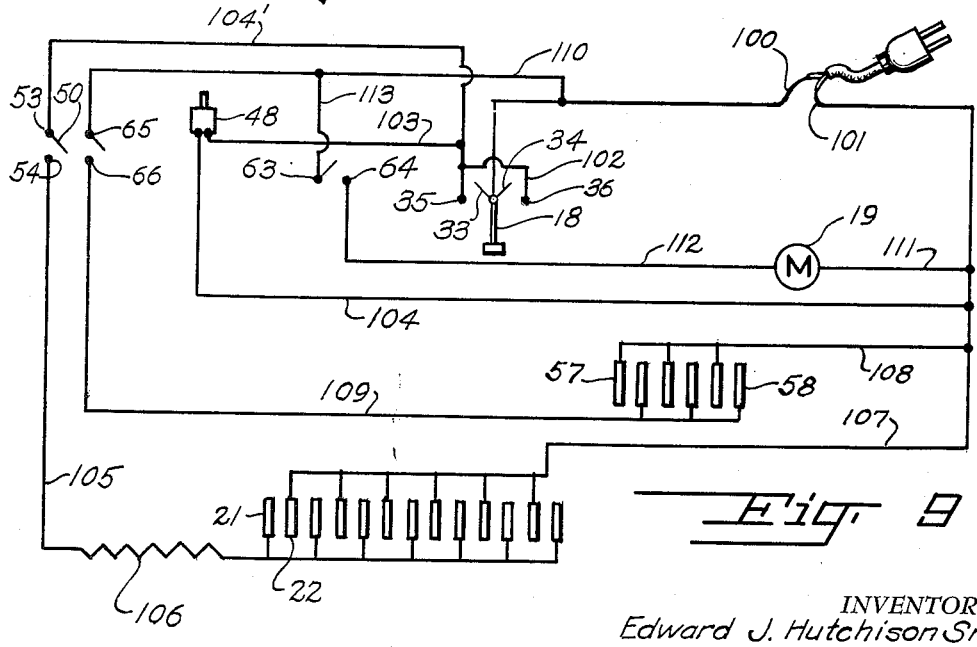
Figure 9 is a view showing a wiring diagram for connecting the electric circuits through the device.

In the wiring diagram as illustrated in Fig. 9 current is supplied to the trap from a 110 volt circuit through wires 100 and 101 the wire 100 being connected directly to the trigger 18 on the lower end of which the bait is carried and the contacts 33 and 34 on the arm of the trigger being positioned to engage the contacts 35 and 36, respectively.

The contacts 35 and 36 are connected by wires 102 and 103 to the solenoid 48 and the opposite terminal of the solenoid is connected by a wire 104 to the wire 101 whereby a circuit is completed through the solenoid when the bait carrying arm 18 is actuated. The solenoid 48 actuates the latch 39 to release the doors 13 and 14 whereby the doors drop downwardly, rotating the shaft 12 which operates the arm 50 to engage contacts 53 and 54 thereby closing a low voltage circuit to the electrodes 21 and 22 of the grid in the floor 20 of the entrance chamber. This circuit is completed by a wire 104', which is connected to the terminals 35 and 36 of the bait carrying arm contacts and through which the circuit is completed to the wire 100. The opposite side of the circuit is completed from the terminal 54, by a wire 105 to the electrodes 21 through a resistance 106 and from the electrodes 22, by a wire 107 to the wire 101. By this means a low voltage or tickler circuit is completed to the electrodes forming the grid in the entrance chamber.

As the doors 13 and 14 arrive at the closed positions and the door or gate 17 at the open position, the arm 59 on the shaft 12 engages the roller 61 urging the contacts 63 and 64 together whereby the circuit is completed to the motor 19 and the motor returns the shaft 12 to the position in which the doors 13 and 14 extend upwardly as shown in Fig. 1 and the door or gate 17 extends downwardly. In this movement the arm 2 engages the contact arm 52 closing the contacts 65 and 66 whereby a circuit is completed to the electrodes 57 and 58 of the grid in the electrocution chamber 11. The electrodes 57 are connected by a wire 108 to the wire 101 and the electrodes 58 are connected by a wire 109 to the contact 66. The contact 65 is connected by a wire 110 to the wire 100. The motor 19 is connected by a wire 111 to the wire 101 and by a wire 112 to the terminal 64 of the resetting switch. The terminal 63 of the resetting switch is connected by a wire 113 to the wire 110 which is connected to the wire 100.

With the parts arranged in this manner an animal entering the entrance chamber 10 from either end closes the openings at the ends of the chamber by moving the bait 32 which closes a circuit to the solenoid 48, the solenoid 48 releasing the latch 39 and permitting the doors 13 and 14 to close. In this movement the arm 50 engages the spring contact 52 closing the contacts 53 and 54 whereby a low voltage current is supplied to the electrodes 21 and 22 in the grid of the entrance chamber whereby an animal therein, feeling the tickling sensation endeavors to escape. In the closing movement of the doors 13 and 14 the door or gate 17 is opened whereby light through the screen 55 shows through the opening of the door or gate 17 and the animal, seeking the light, passes into the electrocution chamber. At this time the motor closes the door or gate 17 and the arm 50 closes the contacts 65 and 66 whereby high voltage current is supplied to the electrodes 57 and 58 thereby electrocuting the animal.

It will be understood that modifications, within the scope of the appended claim, may be made in the design and arrangement of the parts without departing from the spirit of the invention.

What is claimed is:

An electric trap comprising a housing including an entrance chamber having open ends and an opening in one side thereof, and an electrocution chamber provided with an opening communicating with the housing through the opening in the side thereof, an operating shaft mounted in said housing, a pair of doors connected to said shaft and mounted for movement into and out of closing relation with respect to the open ends of said entrance chamber, a gate carried by said shaft for closing the electrocution chamber, said doors and gate being so affixed to the shaft that when the doors are open the gate is closed, a floor arranged in said entrance chamber and having electrodes therein, a horizontally disposed partition arranged above said floor, a pivotally mounted trigger extended through said partition and provided with a lower pointed end for engaging bait, an electrical circuit for controlling the sequential operations of said trap including contact means actuated upon pivotal movement of said trigger in either direction, and an electrically operated latch means connected to said contact means for holding said doors open against the force of gravity and said gate closed; an arm carried by said shaft, a spring contact finger and a fixed contact mounted on said partition, a contact member carried by said spring contact finger and adapted to be moved by said arm to engage said fixed contact on said partition for completing a low voltage circuit to the electrodes when said shaft is rotated in one direction to close said doors and open said gate, electrodes positioned in the bottom of said electrocution chamber, a second fixed contact carried by said partition and engageable with said contact member carried by said spring arm for selectively completing a high voltage circuit to the electrodes in said electrocution chamber upon rotation of the shaft and arm in an opposite direction, said electrocution chamber being detachably connected to said housing, a motor mounted in said housing and adapted to be connected to a source of electrical energy in said circuit, an offset lever connected to said operating shaft, a worm driven by said motor, a second shaft, a worm gear mounted on said second shaft and meshing with said worm, and an arm connected to said worm gear and having a roller engaging said offset lever for rotating said operating shaft in said opposite direction thereby causing movement of said doors and gate.

References Cited in the file of this patent

UNITED STATES PATENTS

| Number | Name | Date |
|---|---|---|
| 910,532 | Harrington | Jan. 26, 1909 |
| 1,034,251 | Kita | July 30, 1912 |
| 1,349,453 | Hall | Aug. 10, 1920 |
| 1,355,034 | Clifton et al. | Oct. 5, 1920 |
| 1,451,720 | Swank | Apr. 17, 1923 |
| 2,599,017 | Rogers | June 3, 1952 |

FOREIGN PATENTS

| Number | Country | Date |
|---|---|---|
| 127,949 | Australia | June 7, 1948 |